(12) United States Patent
Ehrenberg et al.

(10) Patent No.: US 8,424,686 B2
(45) Date of Patent: Apr. 23, 2013

(54) METHOD AND APPARATUS FOR REINFORCING A TUBULAR-SHAPED SEALING COLLAR EXTENDING FROM A FILTER APPARATUS

(75) Inventors: Brian Ehrenberg, Kearney, NE (US); Chad Banzhaf, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 13/567,457

(22) Filed: Aug. 6, 2012

(65) Prior Publication Data
US 2012/0291408 A1 Nov. 22, 2012

Related U.S. Application Data

(63) Continuation of application No. 11/334,875, filed on Jan. 19, 2006, now abandoned.

(51) Int. Cl.
*B01D 27/00* (2006.01)
*B01D 35/28* (2006.01)
*B01D 29/00* (2006.01)

(52) U.S. Cl.
USPC ........... 210/450; 210/435; 210/437; 210/455; 210/493.1; 55/502

(58) Field of Classification Search .................. None
See application file for complete search history.

(56) References Cited

U.S. PATENT DOCUMENTS

| | | | |
|---|---|---|---|
| 4,473,471 A | 9/1984 | Robichaud et al. | |
| 5,730,769 A * | 3/1998 | Dungs et al. | 55/385.3 |
| 6,149,700 A | 11/2000 | Morgan et al. | |
| 6,306,193 B1 | 10/2001 | Morgan et al. | |
| 6,447,567 B1 | 9/2002 | Ehrenberg | |
| 6,841,007 B1 | 1/2005 | Howard et al. | |
| 2002/0040569 A1 | 4/2002 | Reinhold | |
| 2003/0010721 A1 | 1/2003 | Aldred et al. | |
| 2003/0146149 A1 * | 8/2003 | Binder et al. | 210/497.01 |
| 2004/0104576 A1 | 6/2004 | Krausz et al. | |
| 2005/0044830 A1 * | 3/2005 | Dworatzek et al. | 55/502 |
| 2006/0091061 A1 * | 5/2006 | Brown | 210/440 |
| 2006/0091064 A1 | 5/2006 | Brown et al. | |
| 2007/0163945 A1 | 7/2007 | Ehrenberg et al. | |
| 2008/0016832 A1 | 1/2008 | Krisko et al. | |

FOREIGN PATENT DOCUMENTS

| | | |
|---|---|---|
| DE | 19944344 A1 | 3/2000 |
| EP | 1306117 A1 | 5/2003 |
| EP | 1988982 A2 | 11/2008 |
| GB | 1 535 789 | 12/1978 |
| JP | 2005324147 A | 11/2005 |

* cited by examiner

*Primary Examiner* — Benjamin Kurtz

(74) *Attorney, Agent, or Firm* — Reinhart Boerner Van Deuren P.C.

(57) ABSTRACT

A method and apparatus for reinforcing a tubular-shaped sealing collar, extending from a filter cartridge are provided, by embedding, or substantially encapsulating, a reinforcement element within the tubular-shaped sealing collar, for resisting a change in circumference of at least a portion of the tubular-shaped collar. The collar may be formed from a resiliently compressible foam material, and the reinforcement element may be formed from a substantially non-compressible material.

17 Claims, 3 Drawing Sheets

METHOD AND APPARATUS FOR REINFORCING A TUBULAR-SHAPED SEALING COLLAR EXTENDING FROM A FILTER APPARATUS

CROSS-REFERENCE TO RELATED PATENT APPLICATIONS

This patent application is a Continuation of co-pending U.S. patent application Ser. No. 11/334,875, filed Jan. 19, 2006, the entire teachings and disclosure of which are incorporated herein by reference thereto.

FIELD OF THE INVENTION

This invention relates to filtration of particulate matter from a fluid, such as air with entrained dust entering the intake of an engine or a compressor, and more particularly to providing a seal at an interface of a filter with a fluid supply system external to the filter.

BACKGROUND OF THE INVENTION

In certain applications, such as at the air intake of an engine or an air compressor, it has long been common practice to provide some sort of filtration apparatus, for removing dust, soot, sand, or other particulate matter from the intake air, in order to prevent the particulate matter from causing damage, and to promote long life of the engine or compressor. Such filtration apparatuses often include a tubular-shaped housing having an inlet for unfiltered air, and a clean air outlet, with the clean air outlet being operatively connected to the air intake of the engine or compressor. Such filter apparatuses also typically include a filter cartridge, having a filter pack formed from a filter media through which the air must flow in passing between the unfiltered air inlet and the clean air outlet of the filter apparatus.

Such filter apparatuses are also typically configured in such a manner that the filter cartridge may be removed for cleaning, or exchange, after a pre-determined operating time. For example, U.S. Pat. No. 5,730,769, to Dungs et al., discloses an air filter, for cleaning the combustion air for an internal combustion engine, having a cylindrical housing provided with an unfiltered air inlet and a clean air outlet, with the clean air outlet being mounted substantially concentrically on an axial end face of the housing. An extension tube extends into the housing at the clean air outlet. A filter insert, includes a radial packing on its end face, with the packing being configured to slide onto the center tube at the clean air outlet. The opposite end face of the filter insert is closed. The radial packing is provided with a sealing bead which is freely movable in the radial direction.

Experience has shown, however, that a sealing bead which is freely movable in the radial direction, as taught by Dungs, does not provide an adequate seal in some applications, particularly where the system must operate at a relatively high pressure differential across the filter cartridge, or under conditions where the interval between cleaning or exchange of the filter cartridge is long enough to cause the filter media of the filter cartridge to become dirty enough to create a high differential pressure across the filter cartridge. Experience has shown that this tendency of a freely movable radial seal to leak becomes more prevalent as the diameter of the seal is enlarged to provide increased flow capacity of a filter cartridge.

In an attempt to provide a seal configuration which is better suited for use in filters having increased flow capacity, while yet still providing some measure of compressibility in a radial direction, some prior filter elements, such as those shown in U.S. Pat. Nos. 6,149,700 and 6,306,193 B1, to Morgan et al., have provided an extended outer liner, surrounding the outer pleat tips of a pleated filter media, in such a manner that a portion of an end cap of resilient compressible material at an axial end of the filter element bears radially between, and is radially compressed between the outer liner and a flow tube, when the filter element is attached to a filter housing. The addition of the outer liner, as required in the Morgan '700, and '193 patents, for example, undesirably adds complexity and cost to the fabrication and disposal of expended filter elements. The Morgan patents also disclose that the outer liner be fabricated from an expanded wire mesh, or a screen, or from perforated metal. The use of such metallic components is particularly undesirable in filter elements which are designed, and/or required by governmental regulations, to be incinerable.

It is desirable, therefore, to provide an improved method and apparatus for reinforcing a seal in a filter apparatus, which overcomes one or more of the drawbacks of prior sealing method and apparatuses, discussed above, and also provides such an improved method and apparatus in a form conducive to providing increased flow capacity through a filter apparatus in which the invention is practiced.

BRIEF SUMMARY OF THE INVENTION

The invention provides an improved method and apparatus for reinforcing a tubular-shaped sealing collar, extending from a filter cartridge, by embedding, or substantially encapsulating, a reinforcement element within the tubular-shaped sealing collar, for resisting a change in circumference of at least a portion of the tubular-shaped collar. By embedding the reinforcement element within the tubular-shaped sealing collar, a radially acting seal is provided, in a form capable of handling high flow rates and pressure differentials across the sealing collar, while still providing ease of installation and removal of the filter cartridge.

In one form of the invention, a tubular-shaped collar, extending from a filter cartridge about an axis of attachment of the filter cartridge, and having a body of resilient material defining a circumference of the tubular-shaped collar about the axis of attachment, includes a reinforcement element embedded within the tubular-shaped sealing collar, for resisting a change in the circumference of at least a portion of the tubular-shaped collar about the axis of attachment.

The substantially tubular-shaped collar may be formed from a resiliently compressible foam material, and the reinforcement element may be formed from a substantially non-compressible material. Where the reinforcement element defines a circumference of the reinforcement element about the axis of attachment, the tubular-shaped collar may be formed from a plastic foam material, and the reinforcement element may be formed from a material that is substantially resistant to a change in circumference of the reinforcement element about the axis of attachment. The reinforcement element may be formed from a plastic material, or other materials which are readily incinerable. The resistance of the reinforcement element to a change in circumference thereof, about the axis of attachment, may be adjusted by selectively reducing the cross-sectional areas of portions of the reinforcement element.

The tubular sealing collar may be formed from a resilient material having a capability for resisting a change in circumference of at least a portion of the tubular sealing collar, and the reinforcement element may be configured to have a greater capacity than the resilient material for resisting a change in circumference of the reinforcement element about the axis of attachment.

In some forms of the invention, the resilient material of the body of the tubular-shaped sealing collar may be utilized for anchoring the reinforcement element within the body of the sealing collar. Openings may be provided through the reinforcement element, for extension therethrough of a portion of the resilient material of the body of the sealing collar.

In some forms of the invention, the reinforcement element may be configured as a substantially tubular-shaped ring, disposed about the axis of attachment. The substantially tubular-shaped ring may include a break therein. A substantially tubular-shaped ring, according to the invention, may also include one or more changes in cross-sectional configuration of certain portions thereof. The cross-sectional area of the tubular-shaped ring may be reduced, in one or more selected areas thereof, by providing one or more openings extending through the one or more selected areas of the reinforcement element.

The invention may be practiced in various forms, such as a method for reinforcing a tubular-shaped sealing collar, a filter apparatus including a tubular-shaped sealing collar, according to the invention, or as a filter cartridge, according to the invention.

Other aspects, objects and advantages of the invention will be apparent from the following description of the invention, in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
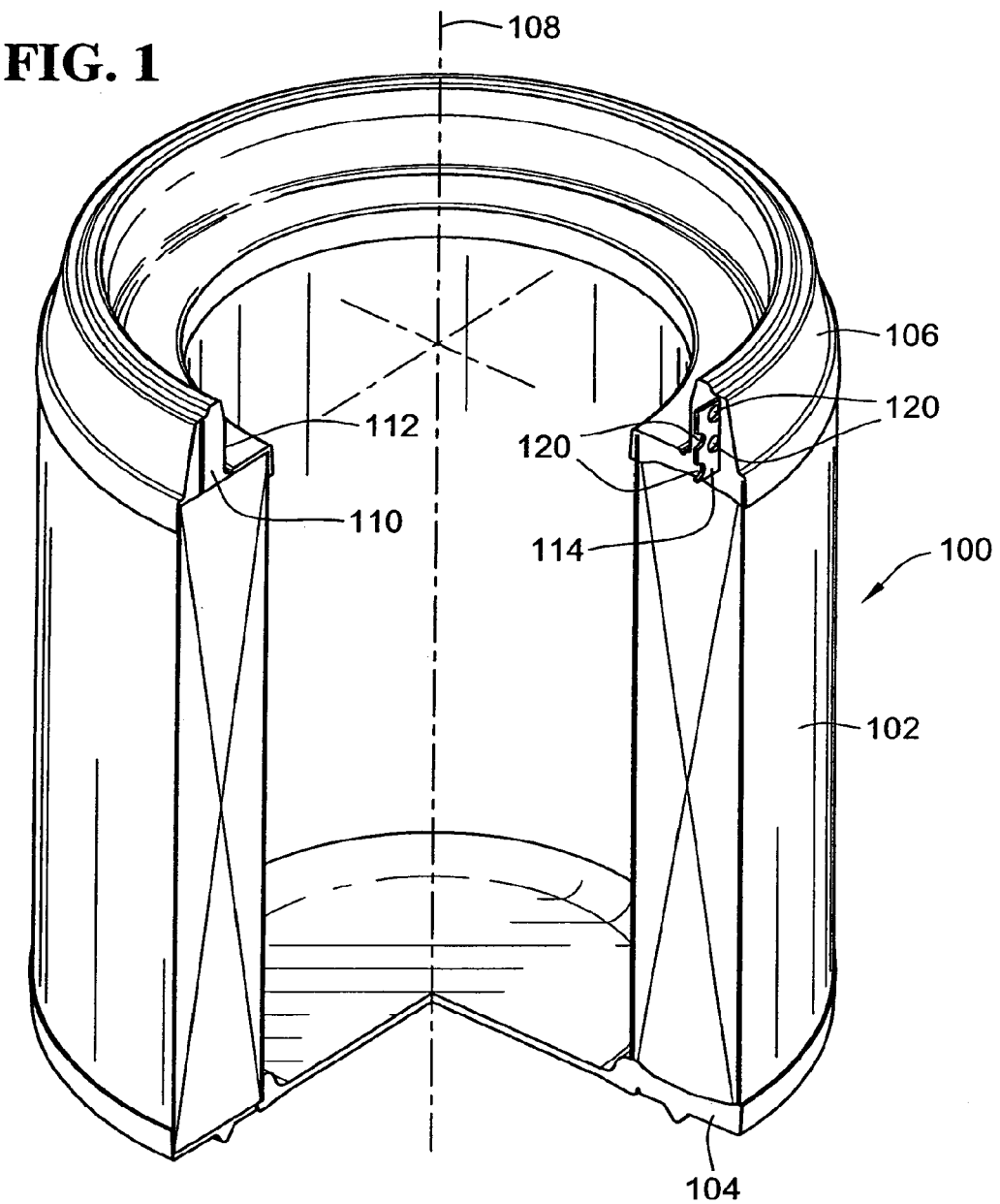
FIG. 1 is a partially cut-away perspective illustration of a first exemplary embodiment of the invention, in the form of a filter cartridge.

FIG. 1 shows a first embodiment of a filter apparatus, according to the invention, in the form of a filter cartridge 100. The exemplary embodiment of the filter cartridge 100 takes the shape, generally, of a right circular cylinder having a generally tubular shaped media pack 102, forming a substantially tubular shape closed at one axial end thereof by a closed end cap 104, and having a tubular-shaped sealing collar 106 extending from an opposite axial end thereof, about an axis of insertion 108 extending generally along a center line of the filter cartridge 100.

The tubular-shaped sealing collar 106 has a body 110, formed from a resilient material, such as a polyurethane foam. An inner, radial-seal-forming surface 112, of the body 110 of the sealing collar 106, defines a circumference of the collar 106 about the axis of insertion 108.

Figure 2:
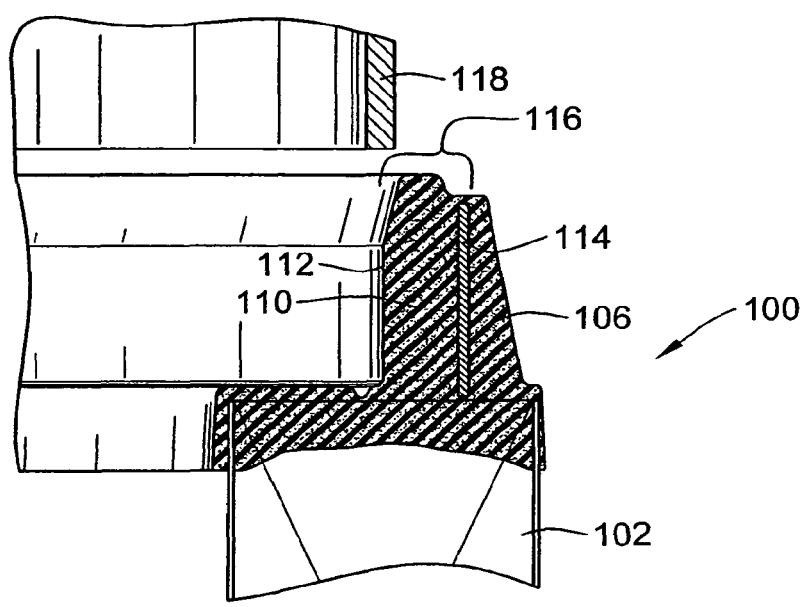
FIGS. 2 and 3 are enlarged, partial cross-sections, of a portion of a sealing collar of the exemplary embodiment of the filter cartridge shown in FIG. 1, with FIG. 2 illustrating the sealing collar just prior to engagement with an outlet tube, and FIG. 3 showing the outlet tube and sealing collar in full engagement with one another.

The tubular-shaped sealing collar 106 also includes a reinforcement element 114 embedded within the body 110 of the tubular-shaped sealing collar 106, in such a manner that the reinforcement element 114 is substantially encapsulated within the body 110 of the tubular-shaped sealing collar 106. Even though the tubular-shaped sealing collar 106 is formed from a resilient foam material, it nevertheless has some inherent capability for resisting a change in the circumference of the inner radial-seal-forming surface 112 of the sealing collar 106, and a portion 116 of the sealing collar 106 disposed between the inner surface 112 of the body 110 of the sealing collar 106 and a radially inner surface of the reinforcement element 114. In the exemplary embodiment, the reinforcement element 114 is formed from a material which has a greater capacity for resisting a change in the circumference of the portion 116 of the body 110 of the tubular collar 106, about the axis of insertion 108, than the portion of body 116 would have if the reinforcement element 114 were not present. As a result, when an outlet tube 118, as shown in FIG. 2, is operatively joined to the tubular-shaped sealing collar 106, in the manner shown in FIG. 3, the reinforcement element 114 precludes the tubular-shaped collar 106 from expanding circumferentially, to as great a degree as it would if the reinforcement element 114 were not embedded within the body 110 of the tubular-shaped sealing collar 106.

The degree to which the reinforcement element 114 restricts expansion of the circumference of the body 110 of the tubular-shaped sealing collar 106 may be selectively adjusted, during design and fabrication of the exemplary embodiment, to provide a desired level of reinforcement of the body 110 of the tubular-shaped sealing collar 106. In some forms of the invention, for example, it may be desirable to form the reinforcement element 114 from a metallic material, such as steel, aluminum, or brass, or a rigid plastic, for example, to provide a very high degree of resistance to expansion of the circumference defined by the inner surface 112 of the body 110 of the tubular-shaped sealing collar 106. In other embodiments of the invention, it may be desirable to use a material for the reinforcement element 114, having a degree of give to it, such as polypropylene, for example.

The degree of reinforcement provide by the reinforcement element 114, may be further adjusted, by locally reducing the cross-sectional area of the reinforcement element 114, in certain selected areas thereof, by, for example, perforating the reinforcement element 114 with holes 120, in the manner shown in FIG. 1. Such reductions in cross-sectional area may be advantageous, for example, where it is desired to use a reinforcement element 114 having a thickness which is conducive to holding the shape and position of the reinforcement element 114, within a mold used for allowing the body 110 of the tubular-shaped sealing collar 106 to form about the reinforcement element 114. By selectively reducing the wall thickness of the reinforcement element 114, in certain localized areas thereof, a reinforcement element having a greater thickness may be used, to provide the desired structural strength for facilitating embedding the reinforcement element 114 in the body 110 of the tubular collar 106, while still providing a lower resistance to a change in circumference of the reinforcement element than would be achieved if the cross-sectional area of the reinforcement element 114 remained constant throughout its circumference. Stated conversely, where a reinforcement element 114 would otherwise have to have a thickness, a desired level of restraint on a change in circumference, that was too thin to retain its shape and/or position during the process of embedding the reinforcement 114 in the body 110 of the tubular sealing collar 106, the ability to locally reduce the thickness of the reinforcement element 114, in certain selected areas thereof, allows the reinforcement element 114 to be made generally thick enough to be readily handled during embedding of the reinforcement element 114 in the body 110, while still providing the desired degree of resistance to a change in circumference of the reinforcement element 114 and the tubular-shaped sealing collar 106.

Those having skill in the art, will recognize that the selection of a material and configuration for the reinforcement element 114 will generally be made, primarily on the basis of the desired resultant radial force produced by the tubular-shaped sealing collar 106, according to the invention, against the outlet collar 118, for a given application, in order to provide a flow and pressure capability as desired for the filter cartridge 100. Other factors, however, may also influence the selection of materials for the reinforcement element 114. For example, where it is desired that a filter cartridge 100, according to the invention, be substantially completely incinerable, it may be desirable and/or necessary to use incinerable materials, such as plastic, for the reinforcement element 114, rather than metallic materials.

Figure 3:
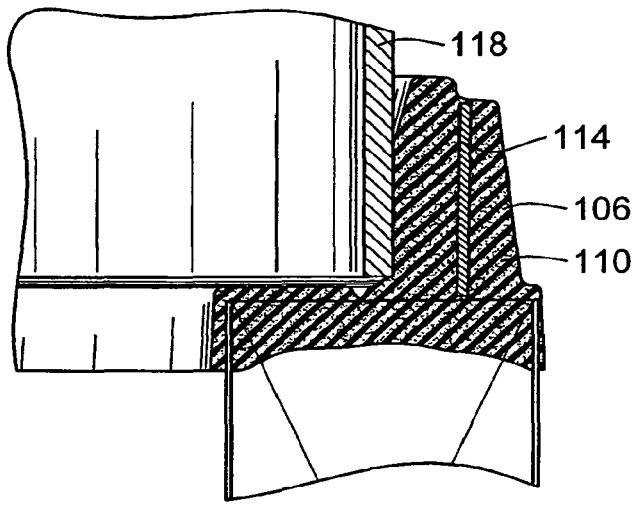
Figure 4:
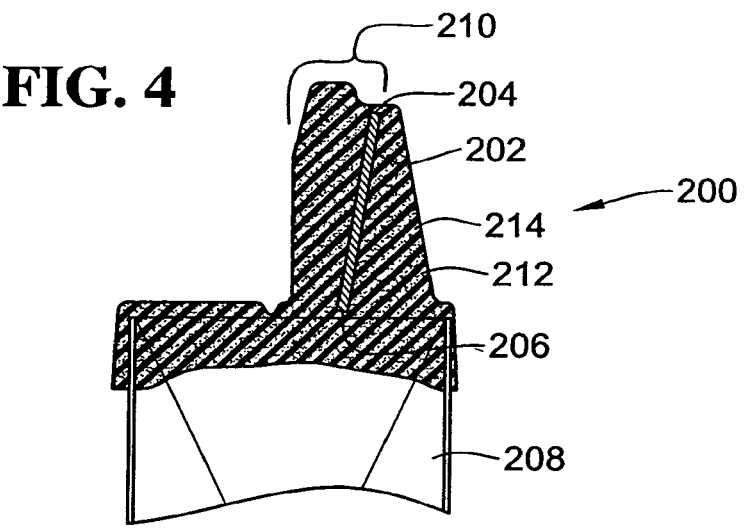
FIGS. 4-6 are cross-sectional illustrations showing several alternate configurations of a reinforcement element embedded within a body of the sealing collar of the type illustrated in the exemplary embodiments of FIGS. 1-3.

Those having skill in the art will also readily recognize that a reinforcement element, according to the invention, may be configured in a wide variety of alternate shapes which, although substantially tubular, differ somewhat or even considerably from the reinforcement element 114 shown in FIGS. 1-3 and described above. For example, in the alternate exemplary embodiment of a filter cartridge 200 shown in FIG. 4, the reinforcement element 202 has a somewhat truncated conical shape, having a circumference at an outer, distal end 204, thereof which is larger than a circumference at an inner end 206, thereof where the reinforcement element 202 is attached to a filter pack 208 of the filter cartridge 200. As a result of this arrangement, resistance to a change in circumference of the portion 210 of the body 212 of the tubular-shaped collar 214 of the second exemplary embodiment of the filter cartridge 200 is less resistant to change, at a distal edge thereof, when an outlet tube (not shown) first engages the distal end of the tubular-shaped sealing collar 214, to thereby facilitate initial engagement between the outlet collar and the tubular-shaped collar 214, with resistance to a change in circumference of the portion 210 of the body 212 increasing as the outlet tube moves further into the tubular-shaped collar 214, toward the filter pack 208.

Figure 5:
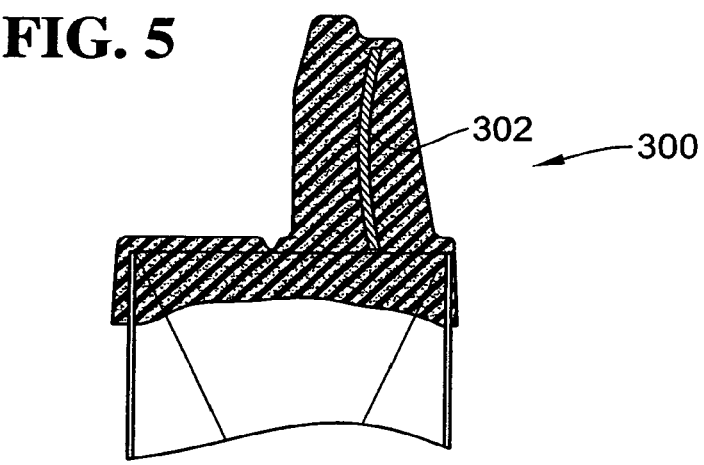
Figure 6:
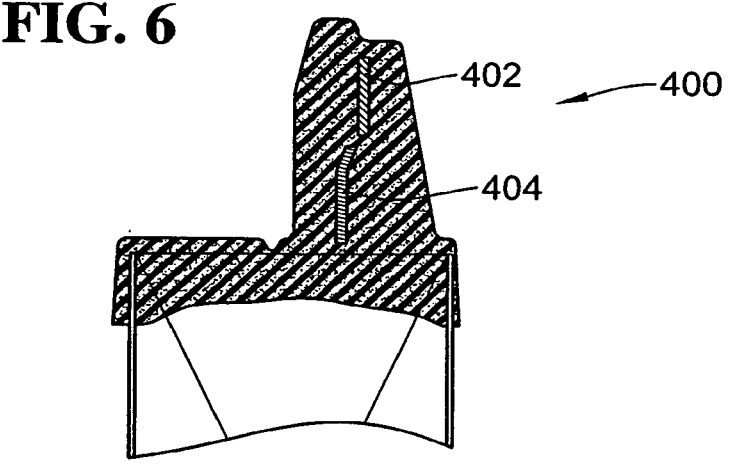

A reinforcement element, according to the invention, may take an almost unlimited variety of other shapes, in practicing the invention. As shown in FIG. 5, for example, a reinforcement element 302 has a curved cross-sectional profile in a third exemplary embodiment of a filter cartridge 300. As illustrated in FIG. 6, a reinforcement element, according to the invention, may also be made up of multiple pieces 402, 404, in a fourth exemplary embodiment of a filter cartridge 400, according to the invention. Multiple, reinforcement elements, disposed substantially concentrically with one another may also be utilized, to provide a progressively increasing resistance to a change in circumference of the sealing collar.

A reinforcement element 114, according to the invention, may also include other means for adjusting its resistance to change in circumference, such as formed corrugations, impressions, or other changes in cross-sectional shape along its circumference, to provide a desired resistance to change in the circumference of the reinforcement element. Such changes may be uniformly distributed, or localized, along the circumference. Particularly where a tubular-shaped sealing collar, according to the invention, has a non-circular shape, such as a race-track shape, or a rectangular shape, for example, it may be desirable to locally alter the configuration of the reinforcement element to achieve an overall performance of the tubular-shaped sealing collar which is particularly well suited to a given application of the invention.

In some embodiments of the invention, the resilient material forming the body of the tubular-shaped sealing collar is utilized for anchoring the reinforcement element within the body of the tubular-shaped sealing collar. For some combinations of materials used in forming the body and reinforcement element, there may be a natural adhesion between the resilient material of the body and the material used for forming the reinforcement element. In other embodiments, one or more openings, such as the holes 120 shown in FIG. 1, may be provided in the reinforcement element, for extension therethrough of a portion, or portions, of the resilient material of the body of the sealing collar.

Although the exemplary embodiments described herein, and shown in FIG. 1 substantially take the form of a right-circular-shaped cylinder, those having skill in the art will recognize that the invention may also be practiced with efficacy in filter apparatuses, and filter cartridges having other cross-sectional shapes, such as race-track-shaped, or rectangular.

It will also be recognized that a tubular-shaped sealing collar, according to the invention, need not be located at an axial end of a filter cartridge. In some forms of the invention, for example, a tubular-shaped sealing collar, having a reinforcement element, according to the invention, may extend radially outward, for example, from a filter element. In such instances, the tubular-shaped sealing collar may define an axis of attachment along which the sealing collar is moved to slide the sealing collar over or into an attachment tube, or conversely, an attachment tube may be moved along the attachment axis over, or into the sealing collar.

It will further be recognized that, although the exemplary embodiments described and illustrated herein include a tubular-shaped sealing collar, according the invention, at an outlet connection, the invention may be employed with efficacy at an inlet connection, in other embodiments of the invention.

Those having skill in the art will further recognize, that although all of the exemplary embodiments described herein specifically show a tubular-shaped sealing collar having a radially inner surface thereof, adapted for receiving therein an attachment to be, in other embodiments of the invention, the respective arrangement of the tubular-shaped sealing collar and attachment tube may be reversed, in such a manner that a radially outer surface of the tubular-shaped sealing collar may be adapted for engaging an inner surface of an attachment tube.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter apparatus, comprising:
   a filter cartridge, defining an axis of attachment of the filter cartridge, and including a filter element, and a tubular-shaped sealing collar, extending from the filter cartridge about the axis of attachment of the filter cartridge;
   the tubular-shaped sealing collar having a body of resilient material defining a circumference of the collar about the axis of attachment and including a radially interior wall having a first sealing portion and a second sealing portion, the second sealing portion extending away from an axial end of the first sealing portion at an obtuse angle, the tubular-shaped sealing collar having a stepped end at an axial most extent thereof, with first and second axial faces, wherein the second axial face extends axially beyond the first axial face;
   the tubular-shaped sealing collar also having a reinforcement element completely embedded within the body of the tubular shaped sealing collar and positioned radially outward of the second axial face, for resisting a change in the circumference of at least a portion of the tubular shaped collar about the axis of attachment, the reinforcement element extending axially at a length that is greater than the first sealing portion and less than the second sealing portion such that, wherein the reinforcement element is parallel to the first sealing portion.

2. The apparatus of claim 1, wherein the substantially tubular-shaped collar is formed from a resiliently compressible foam material, and the reinforcement element is formed from a substantially non-compressible material.

3. The apparatus of claim 2, wherein the reinforcement element defines a circumference of the reinforcement element about the axis of attachment, the tubular collar is formed from a plastic foam material, and the reinforcement element is formed from a material that is substantially resistant to a change in circumference of the reinforcement element about the axis of attachment.

4. The apparatus of claim 3, further wherein the tubular collar is formed from a plastic material.

5. The apparatus of claim 3, wherein the reinforcement element defines a cross sectional area thereof, with selected portions of that cross sectional area being selectively reduced in area, for adjusting the resistance of the reinforcement element to a change in circumference of the reinforcement element about the axis of attachment.

6. The apparatus of claim 1, wherein the tubular sealing collar is formed from a resilient material having a capability for resisting a change in circumference of at least a portion of the tubular sealing collar, and the material from which the reinforcement element is formed has a greater capability than the resilient material for resisting a change in the circumference of the reinforcement element about the axis of attachment.

7. The apparatus of claim 6, wherein, the resilient material operatively anchors the reinforcement element within the body of the tubular-shaped sealing collar.

8. The apparatus of claim 7, wherein, the reinforcement element includes openings therein for extension therethrough of portions of the resilient element.

9. The apparatus of claim 1, wherein, the reinforcement element is a substantially tubular-shaped ring, disposed about the axis of attachment.

10. A filter cartridge, defining an axis of insertion of the filter cartridge, the filter cartridge comprising:
    a filter element comprising a tubular ring of filter media with a tubular-shaped sealing collar extending axially from the filter element about the axis of insertion of the filter cartridge;
    the tubular-shaped sealing collar having a body of resilient material defining a circumference of the collar about the axis of insertion, the tubular-shaped sealing collar having a stepped axial end at an axial most extent thereof, with first and second axial faces, wherein the second axial face extends axially beyond the first axial face;
    the tubular-shaped sealing collar also having a reinforcement element in the form of a substantially tubular-shaped ring completely embedded within the body of tubular shaped sealing collar and positioned radially outward of the second axial face, for resisting a change in the circumference of at least a portion of the tubular shaped collar about the axis of insertion, the reinforcement element extending axially to a distal end which does not extend axially beyond the first axial extent of the stepped axial end.

11. The filter cartridge of claim 10, wherein the reinforcement element defines a circumference of the reinforcement element about the axis of insertion, the tubular collar is formed from a substantially elastically deformable foam material, and the reinforcement element is formed from a material that is substantially resistant to a change in circumference of the reinforcement element about the axis of insertion.

12. The filter cartridge of claim 10, wherein, the body of the tubular-shaped sealing collar includes a distal end thereof, and defines an axial length of the collar extending from the filter element to the distal end of the body of the collar, and the reinforcement element is configured to provide differing resistance to a change in the circumference of a portion of the tubular shaped collar about the axis of insertion at one or more points along the axial length of the collar.

13. The filter cartridge of claim 12, wherein, the reinforcement element and body are cooperatively configured to provide a lead-in area of the collar providing reduced resistance to a change in the circumference of a portion of the tubular shaped collar about the axis of insertion at the distal end of the collar, as the cartridge is moved along the axis of insertion during installation of the filter cartridge, to thereby facilitate operative attachment of the filter cartridge to a fluid system.

14. The filter cartridge of claim 10, wherein the tubular-shaped sealing collar forms an axial end cap of the filter element through integral attachment to a first axial end of the filter media.

15. The filter cartridge of claim 14, further comprising an end cap integrally attached and sealing a second axial end of the filter media through integral attachment to the second axial end, such that only radial flow is permitted through the filter cartridge.

16. The filter cartridge of claim 10, wherein the stepped axial end is part of a sealing projection extending axially away from filter media, wherein the sealing projection provides the stepped axial end and is interposed between a radially inner-most periphery of the filter media, and a radial outer most periphery of the filter media.

17. The filter cartridge of claim 16, wherein the sealing projection includes a radially inner-most peripheral wall and a radially outer-most peripheral wall that is not parallel with the radial inner most peripheral wall.

* * * * *